Dec. 21, 1926.  1,611,377
A. S. RIGGS
ELECTRICAL CONTROL SYSTEM
Original Filed June 14, 1921  2 Sheets-Sheet 1

Inventor
Algernon Smith Riggs,
By Royal E. Burnham,
Attorney

WITNESS:
Chas. L. Griestauer

Dec. 21, 1926.

A. S. RIGGS 1,611,377

ELECTRICAL CONTROL SYSTEM

Original Filed June 14, 1921   2 Sheets-Sheet 2

Inventor
Algernon Smith Riggs,
By Royal E. Burnham,
Attorney

WITNESS:-
Chas. L. Griesbauer

Patented Dec. 21, 1926.

1,611,377

UNITED STATES PATENT OFFICE.

ALGERNON SMITH RIGGS, OF WOODCLIFF-ON-THE-HUDSON, NEW JERSEY.

ELECTRICAL CONTROL SYSTEM.

Application filed June 14, 1921, Serial No. 477,516. Renewed May 7, 1926.

The invention provides an arrangement whereby an electric circuit, when either inadvertently or intentionally opened, immediately is short circuited automatically and maintained in closed condition until the circuit is restored to a normal state, in order that dangerous and injurious conditions that would result from the unrestricted building up of high potential across unclosed terminals may be avoided.

The invention is adapted particularly for use with, and it is described herein as applied to, the secondary circuit of a series transformer connected to a meter or other electro-responsive device.

It is an object of the invention to maintain such a circuit in a closed condition regardless of the conditions that may obtain therein beyond the secondary of the series transformer or other source of current.

Another object of the invention is so to arrange a system of this character that the secondary of a series transformer or other source of current may not remain in circuit with an electrical measuring or other instrument before connections between the two have been made properly, in order that the connections with the transformer or other electric source may be prevented from being open on connection with an incomplete circuit and cause injury to the transformer or other source and the electro-responsive device or devices associated therewith.

When considered in connection with the description herein, the characteristics of the invention will be apparent from the accompanying drawings, forming part hereof, wherein embodiments of the invention are disclosed, for purposes of illustration.

Although the invention is exemplified herein in association with the secondary of a series transformer, it is to be understood that it is not the intention to be limited necessarily thereto in interpretation of the claims, as modifications and adaptations within the limits of the claims can be made without departing from the nature of the invention.

Like reference-characters refer to corresponding parts in the views of the drawings, of which—

Figure 1:
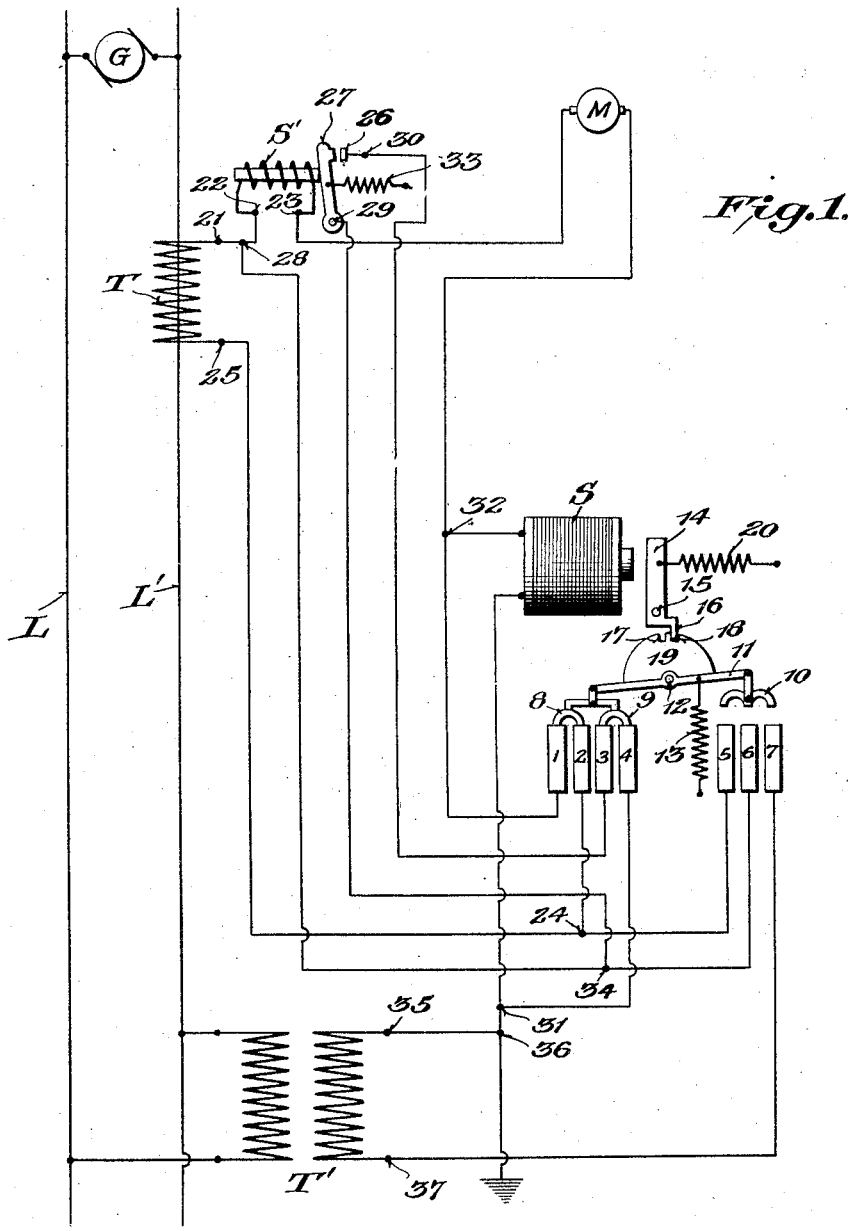
Figure 2:
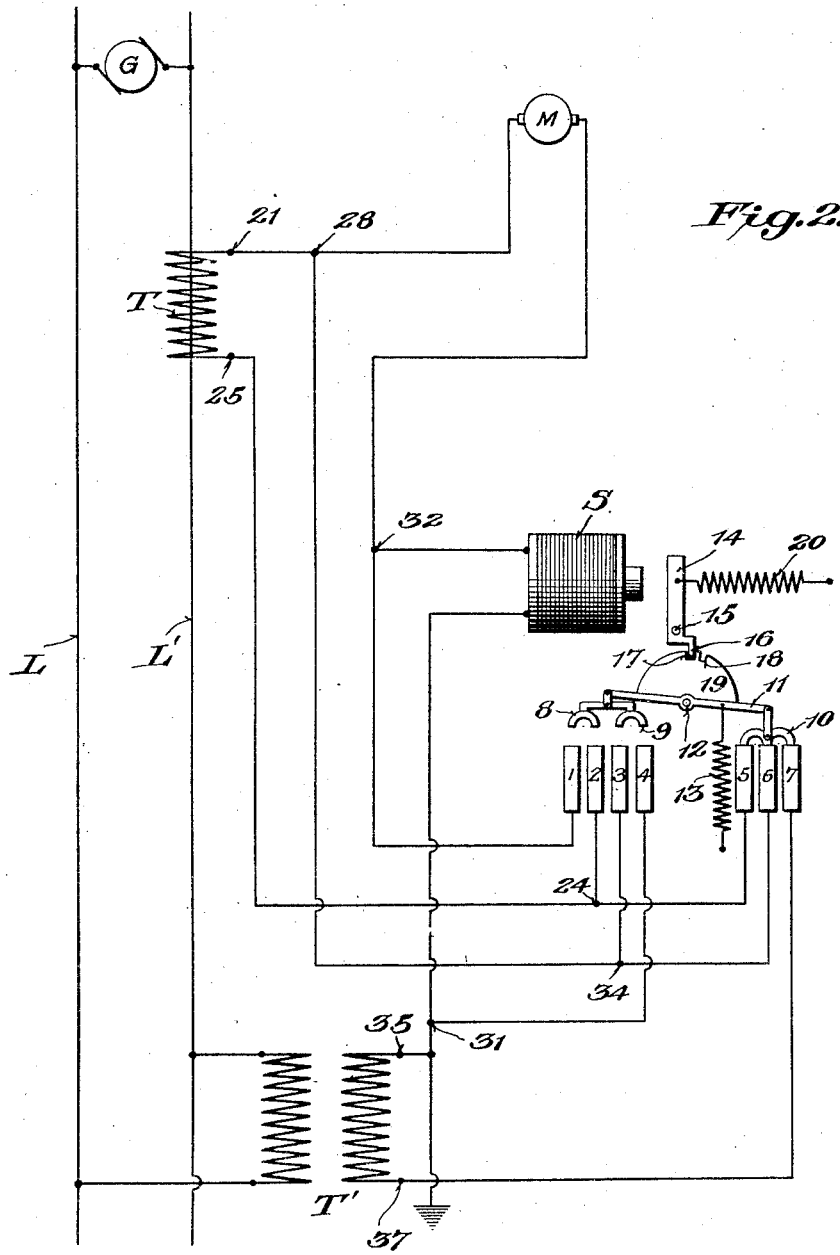

Fig. 1 is a diagrammatic illustration of an embodiment of the invention in a system arranged for use in association with sensitive electro-responsive devices, certain parts of the circuit-controller being shown in one of their positions; and Fig. 2 is a diagrammatic illustration of an embodiment of the invention arranged for ordinary use, parts of the circuit-controller being shown in another of their positions.

Having more particular reference to the drawings, L and L' designate mains carrying current produced by an alternating-current generator G.

A series transformer T is associated with one of the mains (L'), and its secondary is connected in an operating circuit with an electro-responsive instrument or device, such as a meter M.

A circuit-controller is inter-connected between the transformer and the instrument. The controller includes stationary contacts 1, 2, 3, 4, 5, 6, and 7, and movable contacts 8, 9, and 10.

The movable contacts are carried by a member 11 of insulating material pivotally mounted at 12 intermediately of its ends. A spring 13 is arranged to swing the member 11 and thereby to move the contact 10 into connecting engagement with contacts 5, 6, and 7, and at the same time to move contacts 8 and 9 from contacts 1, 2, 3, and 4.

An armature 14, pivotally mounted at 15, has an extension 16 arranged to engage seats 17 and 18 in a part 19 fixed to the member 11, and a spring 20 is arranged to maintain the extension in one or the other of the seats.

Normally the extension 16 is in engagement with seat 18 and maintains contacts 8 and 9 closed with contacts 1 and 2 and 3 and 4, respectively, the contact 10 then being open from contacts 5, 6, and 7.

When the member 11 and the parts carried thereby are in those positions, as shown by Fig. 1, current from the secondary of the transformer traverses, through conductors shown, the following course: From one terminal of the transformer at point 21 to point 22, through a series coil S' to point 23, thence to and through instrument M, thence to and through contacts 1, 8, and 2, thence to point 24, and back to the other terminal of the transformer at point 25.

An electro-magnet S, arranged to move the armature 14, has a relatively high resistance winding connected directly across the secondary terminals of the transformer T through the following circuit, which normally is held open by a make-and-break device or relay that includes a stationary contact 26, a movable contact 27, and coil S': Point 21, to point 28, to point 34, to pivot-point 29 of movable contact 27, to point 26, to point 30, through contacts 3, 9, and 4 to point 31, through electro-magnet S to point 32, through contacts 1, 8, and 2 to point 24, and thence to the other terminal of the transformer at point 25.

As the circuit through the electro-magnet S is open at contacts 26 and 27 while normal conditions obtain in the instrument or operating circuit, the magnet has no effect upon the accuracy or other functioning of the instrument or other device operated by the latter circuit.

If the circuit between points 28 and 32 through the device M is opened, the secondary of the transformer T, because of its open-circuited condition, will begin to build up a high potential across its terminals 21 and 25, which, if permitted to continue, may result in injury to installations on the operating circuit and to persons operating thereon.

However, immediately upon the breaking of the operating circuit through the coil S', a spring 33 will move the contact 27 into engagement with the contact 26 and thus close the circuit through the electro-magnet S. Then the high potential induced in the secondary of the transformer T will traverse the following course: Terminal 21 to point 28, to point 34, to point 29, to point 26, through contacts 3, 9, and 4 to point 31, through electro-magnet S to point 32, through contacts 1, 8, and 2, and thence to the other terminal of the transformer at point 25.

The high potential traverses this course until it reaches a predetermined value, whereupon the core of the electro-magnet S is energized sufficiently to move armature 14 and release its extension 16 from engagement with seat 18. Thereupon, the member 11 is swung by spring 13, the contacts 8 and 9 are opened from contacts 1, 2, 3, and 4, and the contact 10 is closed on contacts 5, 6, and 7.

When the parts are in that position, as shown by Fig. 2, the transformer T is short-circuited as follows: Terminal 21, to point 28, through contacts 6, 10, and 5, and thence to the other terminal of the transformer at point 25.

Due to the fact that the electro-magnet has been disenergized by opening of contacts 2 and 4, the spring 20 has returned armature 14 to its original position, brought its extension 16 into engagement with seat 17, and thus locked the controller in the position last described, wherein it is held until the armature again is moved by the electro-magnet.

At the same time, the electro-magnet S is connected in a control circuit, current for which is supplied by a potential transformer T', through the following course: Terminal 35 of the secondary of that transformer, to point 36, through the electro-magnet to point 32, through device M to point 23, through series coil S' to point 28, through contacts 6, 10, and 7, and thence to the other terminal of the transformer T' at point 37.

Current from the transformer T' in traversing the electro-magnet must pass through that part of the operating circuit between points 28 and 32, and as long as that circuit is open between those points no current can flow through and energize the electro-magnet.

Accordingly, the armature 14 will hold the movable contacts of the controller locked in the position last described until the closing of the operating circuit between points 28 and 32. Thus, as long as the operating circuit is open, the secondary of the transformer T is maintained in short-circuited condition.

When the operating circuit is closed, current from the transformer T' will traverse the last-described path, energize the electro-magnet S, cause the extension 16 of the armature 14 to be released from locking engagement with seat 17, and leave the controller free again to be set back to the position shown by Fig. 1 to connect the transformer T to the instrument.

When the instrument or other electro-responsive device operating on the so-called instrument or operating circuit is of such character that its accuracy or functioning will not be affected materially by such a device as electro-magnet S, the latter normally may have closed-circuit association with that circuit, as shown by Fig. 2, and it is unnecessary to employ a relay including series coil S' such as shown by Fig. 1. Such association is shown through the following course: Point 28, through contacts 3, 9, and 4, to point 31, through the electro-magnet to point 32, through contacts 1, 8, and 2, and thence to point 25 of the transformer.

The winding of the electro-magnet being of relatively high resistance, its core will not be energized to armature-operating condition while the circuit operating the instrument or other electro-responsive device is in normal condition. However, upon breaking of the operating circuit, the high potential built up across the terminals of the secondary of the transformer T will energize the magnet, and conditions, movements, and results will take place in the manner and sequence described with respect to the system exemplified by Fig. 1, except, of course, there is no functioning of a relay.

What I claim as new, and desire to secure by Letters Patent, is—

1. In an electric system, the combination of a normally closed operating circuit, a normally open circuit-closer arranged to short circuit a portion of said circuit, a latch member controlling positions of said circuit-closer, and an electro-responsive device connected across said circuit arranged to move said latch member upon the opening of said circuit.

2. In an electric system, the combination of a normally closed operating circuit, a circuit-closer arranged to short circuit a portion of said circuit, a member normally holding said circuit-closer open, means whereby said circuit-closer is closed, and an electro-responsive device connected across said circuit arranged to release said member upon the opening of said circuit.

3. In an electric system, the combination of a series transformer having a secondary winding in a normally closed circuit, a normally open circuit-closer arranged to short-circuit said circuit winding, means whereby said circuit-closer is operated, and an electro-responsive device connected across said circuit arranged to control said operating means upon the opening of said circuit.

4. In an electric system, the combination of a series transformer having a secondary winding in a normally closed circuit, a normally open circuit-closer arranged to short-circuit said winding, means whereby said circuit-closer is operated, and an electro-magnet having a winding of relatively high resistance connected across said circuit arranged to control said operating means upon the opening of said circuit.

5. In an electric system, the combination of a series transformer having a secondary winding in a normally closed circuit, an electro-responsive device normally operating on said circuit, a switch arranged to short-circuit said winding, a member normally holding said switch open, means whereby said switch is closed, and an electro-responsive device connected across said circuit arranged to release said holding member upon the opening of said circuit.

6. In an electric system, the combination of a series transformer having a winding in a normally closed circuit, an electro-responsive device normally operating on said circuit, a switch arranged to short-circuit said winding, a member normally holding said switch open, means whereby said switch is closed, and an electro-magnet having a winding of relatively high resistance connected across said circuit arranged to release said holding member upon the opening of said circuit.

7. In an electric system, the combination of a normally closed operating circuit, a circuit-closer, an electro-responsive device controlled by said operating circuit arranged to hold said circuit-closer open and said circuit-closer being arranged to close upon breaking of said circuit, a circuit controlled by said circuit-closer, and means including an electro-responsive device controlled by said last-mentioned circuit arranged to short circuit said operating circuit.

8. In an electric system, the combination of a normally closed operating circuit, a normally open circuit-closer arranged to short-circuit a portion of said circuit, a member controlling positions of said circuit-closer, a normally open circuit connected across said operating circuit, an electro-responsive device in said normally open circuit arranged to control said member, and means whereby said latter circuit is closed upon the opening of said operating circuit.

9. In an electric system, the combination of an operating circuit, an electro-responsive device normally operating on said circuit, a circuit-closer, connections whereby said operating circuit may be short circuited by said circuit-closer, an electro-magnet having a winding arranged to be connected across said operating circuit by said circuit-closer, a member movable by said electro-magnet controlling positions of said circuit-closer, and a control circuit arranged to be connected by said circuit-closer with said winding and with said electro-responsive device, said circuit-closer being arranged when in one position to keep closed the operating circuit and the circuit through said winding and to keep open said short-circuiting connections and said control circuit, and when in another position to keep open the circuits closed in the other position and to close said short-circuiting connections and to connect said control circuit with said winding and electro-responsive device in series.

10. In an electric system, the combination of an operating circuit, an instrument normally operating on said circuit, an electrically controlled circuit make-and-break device connected in series with said operating circuit and held open thereby when said circuit is closed and arranged to close when said circuit is broken, a circuit-closer, connections whereby said operating circuit may be short circuited by said circuit-closer, an electro-magnet having a winding arranged to be connected across said operating circuit by said circuit-closer and having its circuit controlled by said make-and-break device, a member movable by said electro-magnet controlling positions of said circuit-closer, and a control circuit arranged to be connected by said circuit-closer with said winding and with said electro-responsive device, said circuit-closer being arranged when in one position to keep closed the operating circuit and the circuit through said winding and to keep open said short-circuiting connections and said control circuit, and when in another position to keep open the circuits closed in the other position and to close said short-circuiting connections and to connect said control circuit with said winding and electro-responsive device in series.

11. The combination with a current transformer, an electroresponsive device to be energized therefrom and circuit conductors connected therebetween, of means for short-circuiting the secondary winding of the transformer and a circuit-closer for rendering said means effective when the circuit between the transformer and the electroresponsive device becomes open.

12. The combination with a current transformer, an electroresponsive device to be energized therefrom and circuit conductors connected therebetween, of means for short-circuiting the secondary winding of the current transformer, and means connected in circuit with the transformer and the electroresponsive device for controlling the operation of said short-circuiting means.

13. The combination with a current transformer, an electroresponsive device to be energized therefrom and circuit conductors connected therebetween, of means for short-circuiting the secondary winding of the current transformer, comprising a switch normally open, and means for controlling the closure of said switch comprising an element responsive to current transferred between the transformer and the electroresponsive device.

14. The combination with a current transformer, an electroresponsive device to be energized therefrom and circuit conductors connected therebetween, of means for short-circuiting the secondary winding of the current transformer, and an electro-magnetically-controlled latching device for controlling the short-circuiting means.

15. The combination with a current transformer, an electroresponsive device to be energized therefrom and circuit conductors connected therebetween, of contacts for short-circuiting the secondary winding of the current transformer and resilient means for actuating said contacts.

16. The combination with a current transformer, an electroresponsive device to be energized therefrom and circuit conductors connected therebetween, of a two-position transfer switch, means controlled thereby in one position for connecting the current transformer in circuit with the electroresponsive device, means controlled by the switch in the second position for short-circuiting the transformer and disconnecting the electroresponsive device, and means dependent for its energization upon the circuit between the transformer and the electroresponsive device being closed for effecting the operation of the transfer switch from the former position to the latter position.

In testimony whereof I affix my signature.

ALGERNON SMITH RIGGS.